United States Patent
Herschel et al.

(10) Patent No.: US 7,299,900 B2
(45) Date of Patent: Nov. 27, 2007

(54) BRAKING DEVICE FOR AN INDUSTRIAL TRUCK

(75) Inventors: Jan Herschel, Klein Salinenstrasse (DE); Hans-Friedrich Krull, Quickborn (DE)

(73) Assignee: Jungheinrich AG, Hamburg (DE)

( * ) Notice: Subject to any disclaimer, the term of this patent is extended or adjusted under 35 U.S.C. 154(b) by 404 days.

(21) Appl. No.: 10/691,916

(22) Filed: Oct. 23, 2003

(65) Prior Publication Data
US 2004/0084253 A1    May 6, 2004

(30) Foreign Application Priority Data
Oct. 30, 2002    (DE) ............... 102 51 025

(51) Int. Cl.
*B60T 1/00*    (2006.01)
(52) U.S. Cl. .................... 188/21; 188/360
(58) Field of Classification Search ............ 188/19, 188/21, 360, 345
See application file for complete search history.

(56) References Cited

U.S. PATENT DOCUMENTS

| | | | | |
|---|---|---|---|---|
| 2,018,023 A | * | 10/1935 | Kliesrath | 180/315 |
| 2,069,578 A | * | 2/1937 | Eaton | 188/360 |
| 2,073,163 A | * | 3/1937 | Martin | 188/357 |
| 2,259,832 A | * | 10/1941 | Rudolph | 188/360 |
| 2,354,687 A | * | 8/1944 | Keith et al. | 180/272 |
| 3,173,261 A | * | 3/1965 | Chouings | 60/549 |
| 3,749,451 A | * | 7/1973 | Edsall | 188/345 |
| 3,765,729 A | * | 10/1973 | Toomey | 188/345 |
| 3,810,520 A | * | 5/1974 | Iwata et al. | 180/282 |
| 4,249,643 A | * | 2/1981 | Yoder | 188/112 R |
| 4,505,351 A | * | 3/1985 | Nishikawa et al. | 180/169 |
| 6,079,792 A | * | 6/2000 | Kessler | 303/7 |
| 6,463,377 B2 | * | 10/2002 | Minowa et al. | 701/70 |

\* cited by examiner

*Primary Examiner*—Robert A. Siconolfi
(74) *Attorney, Agent, or Firm*—Vidas, Arrett & Steinkraus, P.A.

(57) ABSTRACT

A braking device for an industrial truck, comprising a hydraulic brake cylinder which is coupled to an actuating element and is connected with at least one hydraulic brake associated with a wheel of the industrial truck via a brake line wherein another hydraulic brake cylinder is connected to the hydraulic brake line, the second brake cylinder is coupled to an electromagnet, and am emergency stop device is provided which supplies a braking signal to the electromagnet to actuate the second brake cylinder.

10 Claims, 2 Drawing Sheets

BRAKING DEVICE FOR AN INDUSTRIAL TRUCK

CROSS-REFERENCE TO RELATED APPLICATIONS

Figure 1:
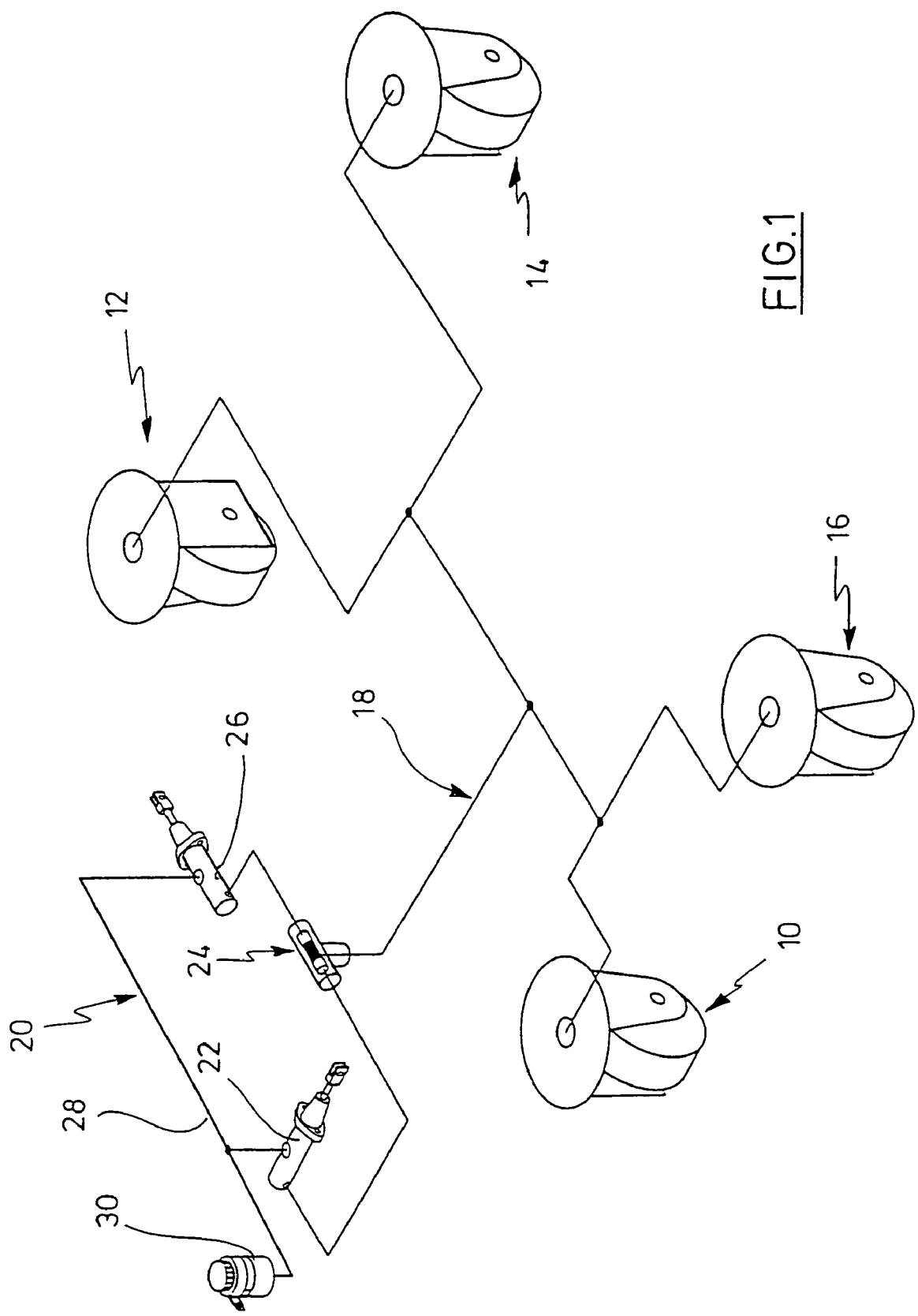

Not applicable.

STATEMENT REGARDING FEDERALLY SPONSORED RESEARCH

Not applicable.

BACKGROUND OF THE INVENTION

It is known to brake at least one wheel of an industrial truck by means of a hydraulic brake. A hydraulic braking device usually includes a hydraulic brake cylinder actuated by a brake pedal that is connected to at least one brake on a wheel via a brake line. Via the brake line, a brake piston is supplied with a pressure in order that brake shoes or brake blocks can get into engagement with a brake drum or brake disc.

It is known to equip industrial trucks and also other vehicles with an electric steering mechanism. In an electric steering mechanism, there is no direct mechanical connection between a steering element such as a steering wheel, and the steered wheel. Rather, the deflection of a steering element is detected and is electrically transmitted to an electric steering actuator which adjusts the steered wheel to the steering angle desired. It cannot be ruled out that such steering mechanisms can no longer be steered if a power failure or another trouble occurs. For this case, it should be made sure that the vehicle be braked in a controlled manner.

It is the object of the invention to provide a braking device for industrial trucks by means of which the vehicle can be automatically braked if a malfunction of vehicle operation occurs, independently of the usual braking action.

BRIEF SUMMARY OF THE INVENTION

In the inventive braking device, the brake line has connected thereto a further hydraulic brake cylinder which, when actuated, also causes a braking procedure. Further, this brake cylinder has associated therewith an electromagnet to actuate the second brake cylinder. If there is a malfunction, e.g. a power failure, in the vehicle an emergency stop device generates an actuation signal for the electromagnet which, as a result, actuates the second brake cylinder.

The invention utilizes the existing hydraulic braking system as the second brake cylinder is also connected to the brake line. Hence, actuating the second brake cylinder will result in a braking procedure as is also effected when the operator actuates the brake pedal. On the other hand, however, the second brake cylinder or its actuation is severed from the common brake actuation because the braking procedure and the braking effect are initiated by an actuation of an electromagnet.

The inventive braking device requires little constructional space and few components for the so-called emergency stop braking procedure.

According to an aspect of the invention, the first and second brake cylinders are connected to the brake line via a shuttle valve. Actuating only one brake cylinder causes the valve member of the shuttle valve to be shifted so that the passage is opened to the brake line. At the same time, the flow line is closed to the second brake cylinder. If the two brake cylinders are actuated simultaneously the braking procedure is carried out by that brake cylinder to which the larger force is applied.

According to another aspect of the invention, the electromagnet is acted on by a spring which is tensioned when the electromagnet is energized. When the electromagnet is de-excited or de-energized the result is that the second brake cylinder is actuated accordingly.

Various constructional approaches are imaginable to actuate the second brake cylinder by means of the electromagnet. According to the invention, one thereof pro-vides that the electromagnet is coupled to the second brake cylinder via a lever linkage. To realize the lever linkage, a further aspect of the invention provides that the electromagnet acts upon a first rod which is hinged to a lever at a first pivot point while the second brake cylinder is hinged to a lever at a second pivot point. More-over, the lever is stationarily supported at a third pivot point with the second pivot point located between the first and third pivot points. This actuates the brake cylinder when the electromagnet pivots the lever.

The third pivot point may also be formed by a rod which stationarily supports the lever in the direction of pull. The rod can shift itself in the opposite direction.

According to a further aspect of the invention, a joint mounting can be provided for the second brake cylinder, the electromagnet and the lever linkage. According to a further aspect of the invention, the mounting may be defined by a plate with the second brake cylinder and the electromagnet disposed on one side of the retaining plate and the lever linkage disposed on the other side of the retaining plate.

The pivot points for the electromagnet and brake cylinder and the stationary support may be adjustable to vary the kinematics.

BRIEF DESCRIPTION OF SEVERAL VIEWS OF THE INVENTION

The invention will be described in more detail below with reference to an embodiment shown in the drawings.

FIG. 1 schematically shows a braking system for an industrial truck having features of the invention.

Figure 2:
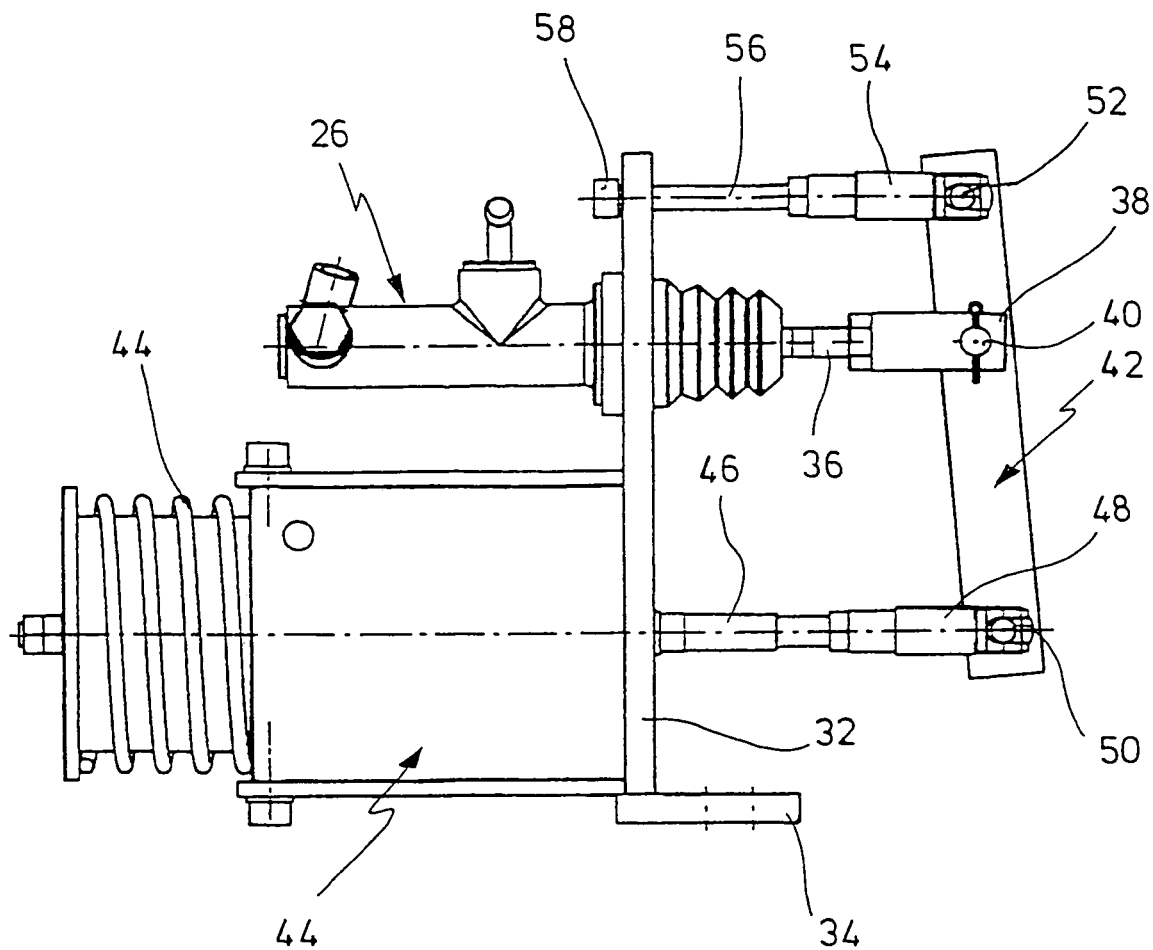

FIG. 2 shows an emergency stop device according to the invention.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated.

In FIG. 1, four wheels 10, 12, 14, 16 of an industrial truck which is not shown in detail are outlined. A hydraulically actuated brake which is not shown either is disposed on each of the wheels 10 to 16. The brakes are connected to a braking device generally designated 20 via a brake line 18. The braking device contains a first brake cylinder 22 which is connected to the brake line 18 via a shuttle valve 24. Further, a second brake cylinder 26 is provided which is also connected to the brake line 18 via the shuttle valve 24. The brake cylinders 22, 26 are in communication with a pressure equalization vessel 30 via a joint line 28.

The brake cylinder 22 is actuated by a brake pedal, which is not shown, of the industrial truck. The way of actuating the second brake cylinder 26 is apparent from FIG. 2.

In FIG. 2, a retaining plate 32 can be seen which can be mounted at an appropriate place in the industrial truck by means of a flange 34. The brake cylinder 26 is mounted on one side of the retaining plate 32. Its piston rod extends through an opening of the retaining plate 32. The piston rod indicated by 36 is connected to a lever 42 in a pivot point 40 via a bifurcated element 38.

A lifting magnet 44 is connected to the retaining plate 32 on the same side. It is biased by a spring 44. The armature of the lifting magnet 44 has connected thereto a rod 46 which is connected to the lever 42 at the pivot point 50 via a bifurcated element 48. The pivot point 50 is located at the lower end (FIG. 2) of the lever 42. A third pivot point 52 is located at the other end of the lever 42 and is connected, via a bifurcated element 54, to a rod 56 which extends through an opening of the retaining plate 32. A stop 58 is mounted on the rod 56 on the other side of the retaining plate so that the rod 56, while moving to the right, is supported on the plate 32, but is capable of moving to the left through the opening of the retaining plate 32.

When the lifting magnet 44 is excited the rod 46 is fully extracted and the spring 44 is tensioned. The brake cylinder 26 is relieved of stress. In a de-energized condition, the electromagnet becomes de-excited and the rod 46 is retracted by the restoring spring 44. This causes the rod 36 to be actuated when the lever 42 is pivoted in a clockwise sense, and so is the brake cylinder 26 which actuates the brakes on the wheels 10 to 16, as a result.

The rods 56 and 46 engage the lever 42 via the bifurcated elements 54, 48 and can be fixed by means of a bolted joint by which it is very possible to hinge them, but not to effect a relative displacement. However, they can be displaced by loosening the bolted joint so that the lengths of engagement can be varied on the rods 56, 46. This is generally the case also for the rod 36 and the bifurcated element 38. Thus, it allows to set the kinematics desired for an actuation of the second brake cylinder 26. Once the setting is made, however, it will fix the braking characteristic which is imposed by means of the second brake cylinder.

The signal for de-exciting the electromagnet 44 can be generated by an emergency stop device which is not shown. It ascertains whether there is a malfunction or power failure.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A braking device for an industrial truck, comprising a first hydraulic brake cylinder which is coupled with an actuation member and which is in fluid communication with a hydraulic brake of the truck through a braking conduit, a second hydraulic braking cylinder, and an electrical device supplied with electric current, the braking conduit being led to a hydraulic brake of at least one wheel of the industrial truck, the second braking cylinder being also connected to the hydraulic braking conduit, the second braking cylinder being actuable by an electric magnet, and an emergency stop device being provided which responds to the omission of the electric current, the emergency stop device supplying a braking signal to the electric magnet for the actuation of the second hydraulic braking cylinder in case of omission of the current.

2. The braking device as claimed in claim 1, characterized in that the first and second brake cylinders (22, 26) are connected to the brake conduit (18) via a shuttle valve (24).

3. The braking device as claimed in claim 1, characterized in that the electromagnet (44) is acted on by a spring (44) which is tensioned when the electromagnet (44) is energized, and which actuates the second brake cylinder (26) when the electromagnet (44) is de-energized.

4. The braking device as claimed in claim 1, characterized in that the electromagnet (44) is coupled to the second brake cylinder (26) via a lever linkage.

5. The braking device as claimed in claim 1, characterized in that the electromagnet (44) acts upon a first rod (46) which is hinged to a lever (42) at a first pivot point (50), the second brake cylinder (26) is hinged to a lever (42) at a second pivot point (40), and the lever (42) is stationarily supported at a third pivot point (52) wherein the second pivot point (40) is located between the first and third pivot points (50, 52), thereby allowing to apply an actuation force to the second brake cylinder (26).

6. The braking device as claimed in claim 5, characterized in that the pivot point (52) has hinged thereto a rod (56) which is stationarily supported only in the direction of pull.

7. The braking device as claimed in claim 4, characterized in that a joint mounting is provided for the second brake cylinder (26) and the electromagnet (44) and the lever linkage.

8. The braking device as claimed in claim 7, characterized in that the second brake cylinder (26) and the electromagnet (44) are disposed on one side of a retaining plate (32) and the lever (42) with the rods (46, 36, 56) is disposed on the other side of the retaining plate (32).

9. The braking device as claimed in claim 5, characterized in that at least one rod (46, 36, 56) is adjustably hinged to the lever (42).

10. The braking device as claimed in claim 8, characterized in that at least one of the rods (46, 36, 56) grips over the lever (42) in the way of a fork and said rods are hinged to the lever (42) by means of a bolted joint.

* * * * *